United States Patent [19]
Bright et al.

[11] Patent Number: 5,437,046
[45] Date of Patent: Jul. 25, 1995

[54] SYSTEM AND METHOD FOR RESOLVING THE LOCATION OF A STATION ON A LOCAL AREA NETWORK

[75] Inventors: Norman T. Bright, Mars; Keith S. Boyce, Wexford, both of Pa.; Robert Clark, Oakland, Calif.

[73] Assignee: Legent Corporation, Pittsburgh, Pa.

[21] Appl. No.: 21,786

[22] Filed: Feb. 24, 1993

[51] Int. Cl.⁶ ..................... H04J 1/16; G06F 11/30
[52] U.S. Cl. ..................... 395/800; 395/200; 364/242.95; 364/DIG. 1; 370/17
[58] Field of Search ............ 395/800, 650, 200; 370/17; 364/242.95, DIG. 1

[56] References Cited

U.S. PATENT DOCUMENTS

| | | | |
|---|---|---|---|
| 4,799,211 | 1/1989 | Felker et al. | 370/17 |
| 4,817,080 | 3/1989 | Soha | 370/17 |
| 4,941,084 | 7/1990 | Terada et al. | 395/650 |
| 5,179,554 | 7/1993 | Lomicka et al. | 370/85.13 |

FOREIGN PATENT DOCUMENTS

| | | |
|---|---|---|
| WO88/06822 | 9/1988 | WIPO . |
| WO92/06547 | 4/1992 | WIPO . |

*Primary Examiner*—Eric Coleman
*Assistant Examiner*—John Harrity

*Attorney, Agent, or Firm*—Kirkpatrick & Lockhart

[57] ABSTRACT

A network monitor, for use in a network comprised of a plurality of segments, each segment connected to at least one other segment by a bridge operating transparently to stations on the network, and for resolving the location of a station on the network, includes a primary resolver for generating and sending a primary probe to the station, a primary observer for monitoring primary probes and for generating and sending a primary observation report in response to the primary probes, a first receiver for receiving the primary observation reports, and a circuit, responsive to the received primary observation reports, for generating and sending secondary probe requests. The network monitor also includes secondary resolvers for receiving the secondary probe requests and for generating and sending secondary probes in response thereto, secondary observers for monitoring secondary probes and for generating and sending a secondary observation report in response thereto, a second receiver for receiving the secondary observation reports, a circuit for creating and transmitting a summary of the received secondary observation reports, a third receiver for receiving the summaries, and a resolver for determining the location of the station based on the primary observation reports and the summaries.

3 Claims, 7 Drawing Sheets

SYSTEM AND METHOD FOR RESOLVING THE LOCATION OF A STATION ON A LOCAL AREA NETWORK

BACKGROUND OF THE INVENTION

Field of the Invention

The present invention is directed generally to a system and method for resolving the location of a station on a network, and more specifically to a system and method for resolving the location of a station on a segment of a network which is transparently bridged to another segment in that network.

Description of the Background of the Invention

There are various computer network topologies and protocols available today. Of particular interest for the present invention and probably the most widely used scheme for controlling a local area network on a bus structure is the Carrier Sense Multiple Access with Collision Detection (CSMA/CD), or the IEEE 802.3 standard. The most widely used implementation of CSMA/CD is found in the Ethernet specification.

Most local area networks may be interconnected via gateways, routers or bridges. A bridge provides the interconnection between two local area networks of the same type and makes decisions about switching frames between local area networks based on the address of a station. Bridges may use different algorithms in making its routing decision, some of which operate transparently to end stations on the network.

The efficient operation of a computer network is critical both in terms of mainframe computer efficiency and individual workstation productivity. The ability to measure network response times associated with the workstations and the ability to determine bottlenecks or other network inefficiencies which may detract from network response time is important for network designers, administrators and end users. Copending U.S. patent application Ser. No. 992,439, which is assigned to the assignee of the present invention and which is hereby incorporated by reference, describes a novel system and method for deriving operating statistics for a local area network based on the role of a station on the network and the network traffic being monitored. Such operating statistics are useful in maintaining the efficient operation of the network.

In the token ring environment, the network monitor as described in the aforementioned copending application is capable of correctly identifying the addresses of the stations residing on its ring by using the active and standby monitor frames of the token ring protocol. Knowing which stations are on the local ring is fundamental in determining the operating statistics as described in that application. In the Ethernet environment, however, it is not always possible for the network monitor to correctly identify the addresses of the stations residing on its local segment because multiple Ethernet segments may be bridged transparently to one another. Such a transparent bridge has the effect of making traffic appear to a network monitor as if it was transmitted by a station on the local segment when, in fact, it may have been transmitted by a station on a bridged segment.

Accordingly, the need exists for a system and method which will permit a network monitor to determine the location of a station on an Ethernet network when segments of that network are transparently bridged to other segments. Network monitors may use such information in determining the role of the station and computing operating statistics based on that determination. Ultimately, such information is critical in maintaining efficient performance of that network.

SUMMARY OF THE INVENTION

The present invention is directed to a network monitor for resolving the location of a station on a network wherein the network comprises a plurality of segments, each segment connected to at least one other segment by a bridge operating transparently to the station. The network monitor includes primary resolution means for generating and sending a primary probe to the station, primary observing means for monitoring primary probes and for generating and sending a primary observation report responsive thereto, means for receiving primary observation reports, means, responsive to the means for receiving, for generating and sending secondary probe requests, secondary resolution means for receiving secondary probe requests and for sending secondary probes in response thereto, secondary observing means for monitoring secondary probes and for generating and sending a secondary observation report in response thereto, means for receiving secondary observation reports, means for creating and transmitting a summary of the received secondary observation reports, means for receiving the summaries, and means for resolving the location of the station based on the primary observation reports and the summaries.

It is anticipated that in a local area network, one network monitor will be provided per segment thereby providing a system for resolving the location of a station on the network.

The present invention is also directed to a method for resolving the location of a station wherein the network has a plurality of segments, each segment connected to at least one other segment by a bridge operating transparently to the station, and wherein each of the segments has a network monitor attached thereto. The method includes the steps of sending a primary probe to a station to be resolved, reporting primary observations of the primary probe, initiating at least one secondary probe request to the station in response to the observations, sending at least one secondary probe to the station in response to the initiating step, reporting secondary observations of the secondary probe, and resolving station ownership in response to the primary observations and secondary observations.

Thus, the system and method of the present invention permit a network monitor to determine the location of a station on an Ethernet network when segments of that network are transparently bridged to other segments. Such a determination is useful for the network monitor to compute operating statistics by monitoring network traffic, such statistics being important for maintaining the efficient operation of a network. These and other advantages and benefits of the present invention will become apparent from the description of a preferred embodiment hereinbelow.

BRIEF DESCRIPTION OF THE DRAWINGS

For the present invention to be clearly understood and readily practiced, preferred embodiments will now be described, by way of example only, with reference to the accompanying figures wherein.

DETAILED DESCRIPTION OF THE PREFERRED EMBODIMENT

Figure 1:
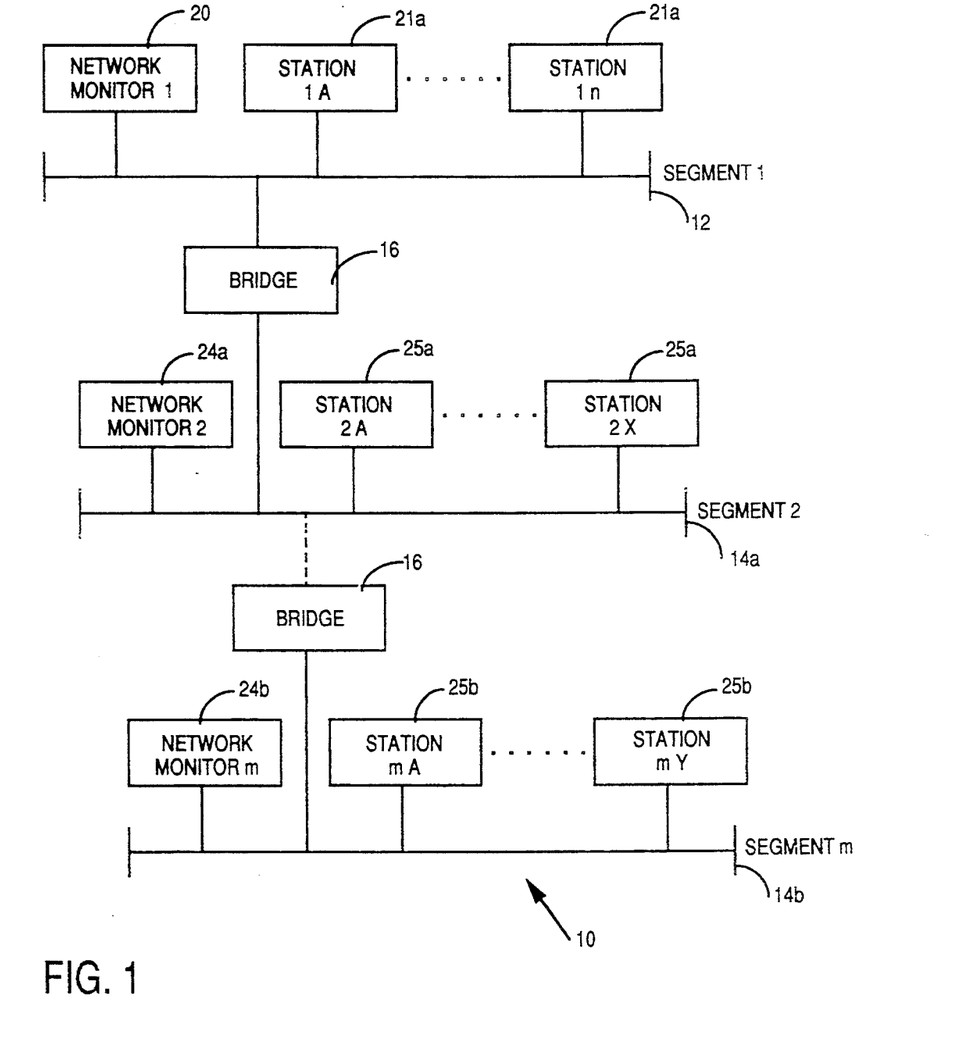
FIG. 1 illustrates a simplified representation of a typical local area network bus configuration with multiple segments bridged together in which the apparatus, system and method of the present invention may be employed.

FIG. 1 illustrates a simplified representation of a typical computer communications network 10 in which the apparatus, system and method of the present invention for generating operating statistics may be employed. Like reference numerals are employed among the various figures to designate like elements.

More particularly, and with reference to FIG. 1, there is shown a local area network 10 comprising m segments, a first segment identified by the numeral 12, a second segment identified by the numeral 14a, and an mth segment identified by the numeral 14b. While the present invention may have applications on any network whose segments are transparently bridged to one another, by way of example only, the present invention will be described as implemented on Ethernet. It will be understood by those skilled in the art that the number of segments m is application dependent. Each of the segments 12, 14a, and 14b, respectively, is a bus structure implementing the CSMA/CD protocol.

Attached to the first segment 12 may be a plurality of stations 21a. The number of stations 21a may vary from one to n, the number n being application dependent. Each of the stations 21a may be, for example, a workstation attached using an appropriate Ethernet adaptor board (not shown). Also attached to this first segment 12 is a network monitor 20. The network monitor 20 may be any type of computer and is attached to the network 10 using an appropriate Ethernet adaptor board (not shown). By way of example, the network monitor 20 may be a personal computer which implements the IBM AT bus structure or the IBM microchannel and the Ethernet adaptor board may be a 3Com Model No. 507 (for an AT bus) or No. 523 (for a microchannel). The Ethernet adaptor board must be capable of operating in the promiscuous mode wherein each frame transmitted on the network 10 is read and received by the Ethernet adaptor board. The network monitor 20 houses the network monitor program, shown functionally in FIG. 2 and further described herein.

In a similar manner, the second segment 14a has x stations 25a and a second network monitor 24a attached thereto, the number x being application dependent. Likewise, the mth segment has y stations 25b and an mth network monitor 24b attached thereto, the number y being application dependent. In each case, the network monitors 20, 24a and 24b are preferably configured in a similar manner. In a preferred embodiment and to insure accuracy, each of the segments 12, 14a, 14b should have a network monitor 20, 24a, 24b attached thereto.

As will be understood by those skilled in the art, the configuration of segments 12, 14a, 14b in FIG. 1 is intended to be an example only. Countless other configurations of segments are possible with the particular configuration being application dependent. The invention described herein is operable on those other various configurations as well.

As can be seen in FIG. 1, the first segment 12 and the second segment 14a are interconnected via bridge 16. Also, the second segment 14a is connected to the mth segment 14b via bridge 16. As used herein, a bridge 16 is a device which provides the interconnection between segments of a local area network 10. The bridge 16, using one of numerous possible algorithms, makes decisions about switching frames between segments based on the address of a station.

The switching algorithms may be transparent to end stations. In an IEEE 802 local area network, the interconnection between local segments 12, 14a, 14b may, for example, occur at the Media Access Control ("MAC") sublayer. As will be appreciated by those skilled in the art, the MAC frame format for CSMA/CD includes both a destination address and a source address. A bridge 16 can use a number of different simple algorithms to make its switching decisions. By way of example only, one such algorithm is a "learn as you go" type algorithm in which the bridge 16 maintains a database of the stations 21a, 25a, 25b which send messages on its attached segments 12, 14a, 14b, respectively. As the bridge 16 monitors a message, it knows on which side of the bridge 16 that the message originated and adds that station address and its position relative to the bridge 16 to its database. The bridge 16, when it picks up a new MAC frame on the network 10, searches that database for the destination address contained in that frame. Forwarding of the frame to the other side of the bridge 16 is based on the results of that search. As such, the simple algorithm requires no effort nor knowledge by end stations 21a, 25a, 25b to switch frames through the bridges 16, so that operation of the bridges is transparent. If the algorithm is similar to the "learn as you go" method as described above, it may be possible that, until steady-state operation is achieved, the bridge 16 may not properly pass all frames, and thus that possibility must be taken into account in the present invention. It is with bridges 16 which operate transparently to end stations 21a, 25a, and 25b wherein the present invention is preferably implemented.

The knowledge that network monitors 20, 24a and 24b are within a transparently bridged group is preferable and aids in the operation of the automated segment resolution of the present invention. Each of those network monitors 20, 24a, 24b are referred to as transparent partners and each network monitor 20, 24a, and 24b preferably maintains a current list of its transparent partners. A unique bit may indicate that a particular network monitor is within a transparently bridged group.

Figure 4A:
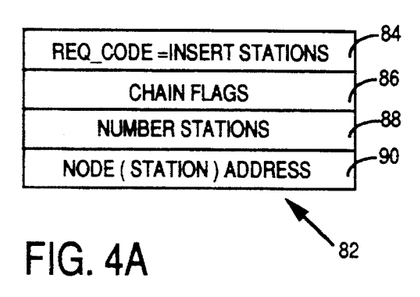
FIGS. 4A through 4L illustrate command block structures for an automatic segment resolution program embodying the method of the present invention.
Figure 4B:
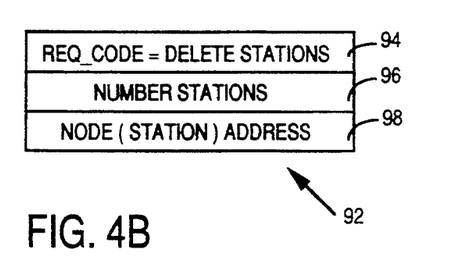
Figure 4C:
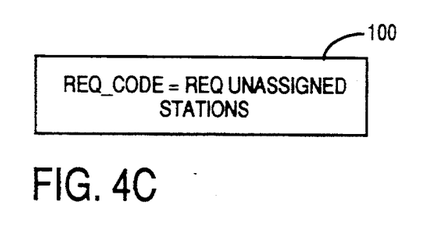
Figure 4D:
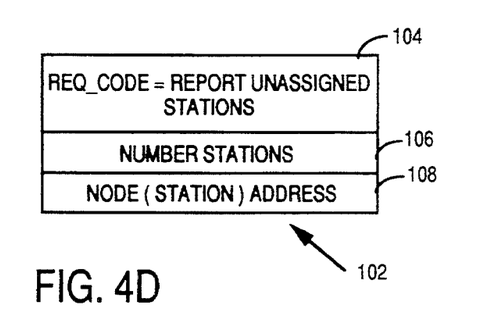
Figure 4E:
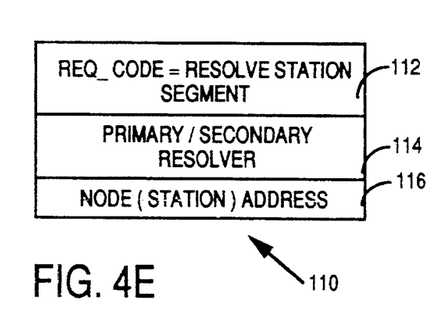
Figure 4F:
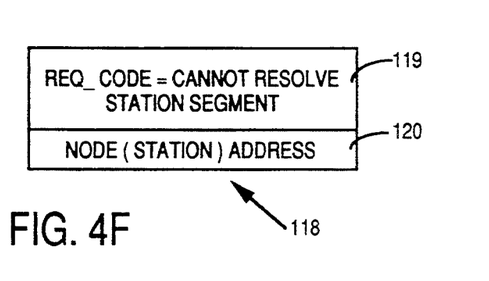
Figure 4G:
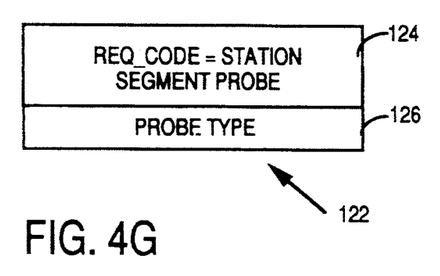
Figure 4H:
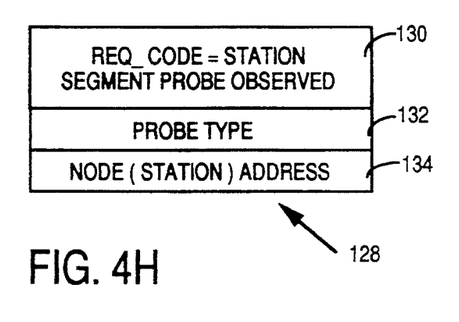
Figure 4I:
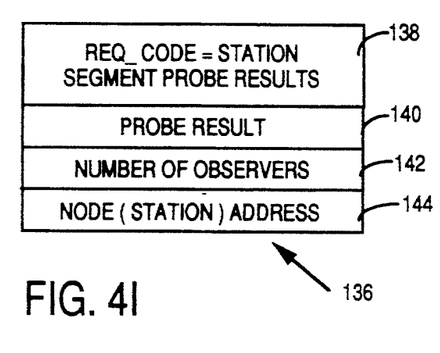
Figure 4J:
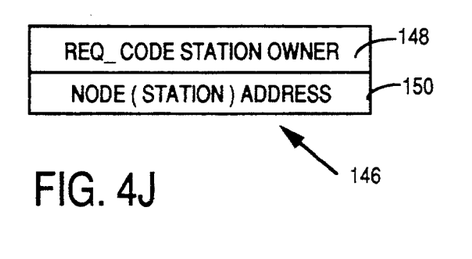
Figure 4K:
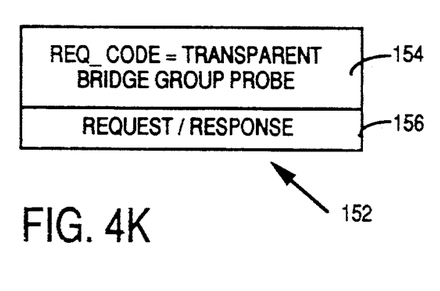

To detect other network monitors, a bridged group probe message shown as control block 152 in FIG. 4K may be sent periodically. Control block 152 includes a command code field 154 and a request/response indicator field 156. Any other network monitor 20, 24a and 24b which sees the bridge group probe message control block 152 will respond with a similar control block 152 with the response bit set in field 156. To maintain current status, the bridge group probe message is preferably sent periodically. To prevent disturbing other stations on the network, the destination address of that packet may, for example, be the universally administered address ("UAA") of an Ethernet board. The Ethertype of the packet will be a unique non-routable value assigned to the implementor for this purpose.

Figure 4L:
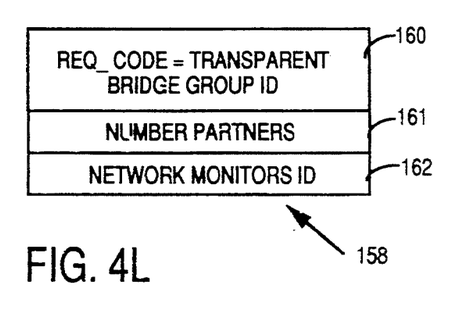

A host based network monitor (not shown), in communication with the local are network 10, will preferably receive a report periodically of transparently bridge groups. Control block 158 in FIG. 4L shows an example of such a reporting mechanism comprising a command code field 160, number of partners field 161 and the network monitor field 162. As such, the host based network monitor (not shown) may keep a current status of the local network monitors 20, 24a and 24b on the attached local area network 10.

Figure 2:
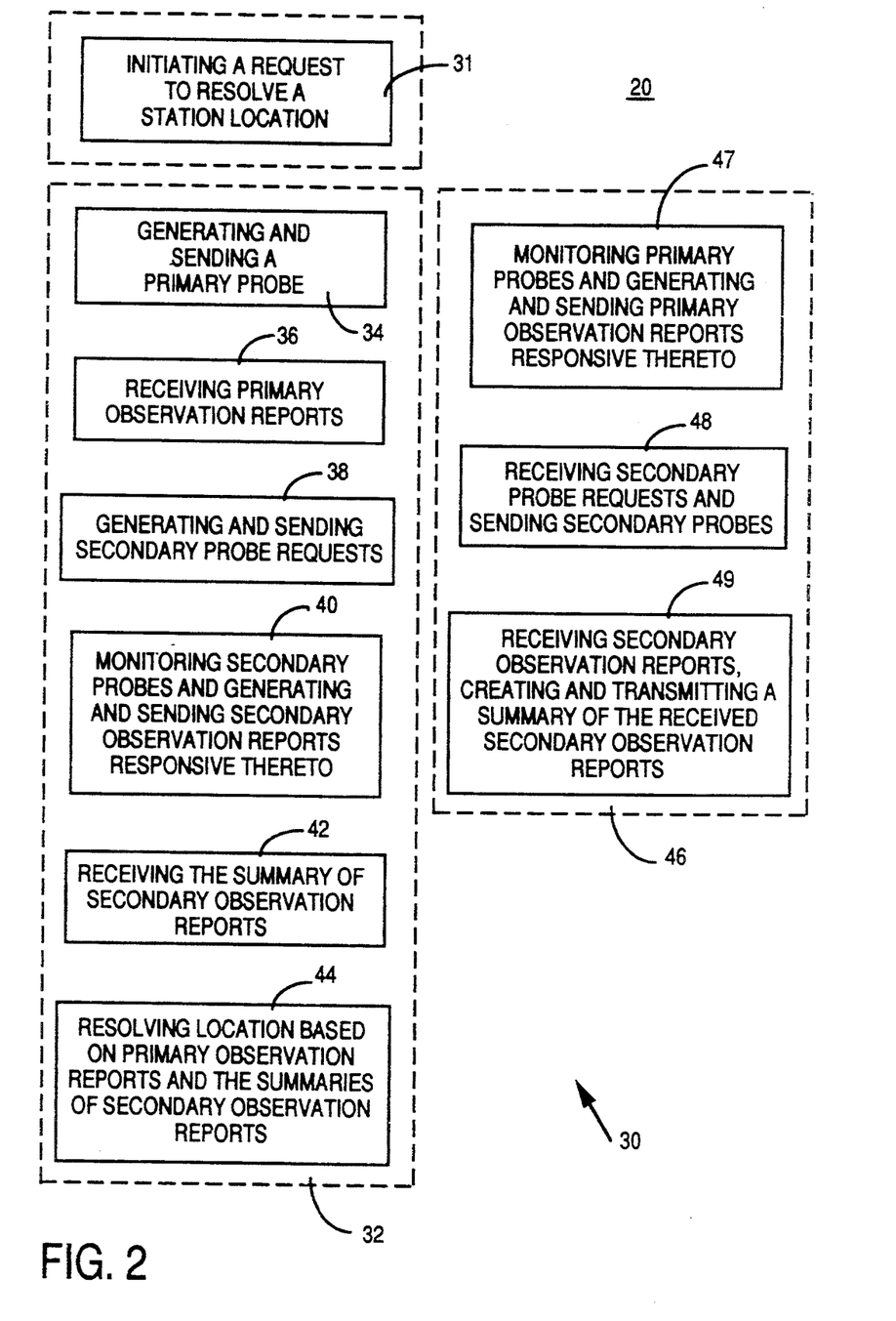
FIG. 2 illustrates a block diagram of the functions of an automatic segment resolution program construction according to the techniques of the present invention.

With reference to FIG. 2, there is shown a functional block diagram 30 of an automatic segment resolution program which forms a portion of the program operating or residing in the first network monitor 20, the second network monitor 24a and the mth network monitor 24b. The functional diagram 30 is subdivided into three portions. The first portion 31 is the function performed if one of the network monitors 20, 24a, 24b is serving as the initiator of the request to resolve the location of a station, 21a, 25a, 25b. The second portion 32 comprises the functions performed if the network monitor 20 is operating as the primary resolver. The third portion 46 comprises the functions performed when the network monitor 20 is not the primary resolver but is part of the transparently bridged group.

The processing flow of one implementation of the automated segment resolution program will now be described with reference to the flowchart illustrated in FIG. 3, and with further reference to the functional block diagram 30 in FIG. 2 and the control blocks found in FIGS. 4A through 4L. For the purposes of this description, the network monitor 20 will be the primary resolver and the other network monitors 24a, 24b will be part of the transparently bridged group.

The processing flow starts when a network monitor 20 is requested to resolve ownership of a particular station. That request may come from a host based network monitor (not shown). Such a request may be in the form as shown in FIG. 4E in control block 110 comprising a request code set to resolve station segment in field 112, a primary resolution request indicated in field 114, and the station address in field 116 representing the particular station to be resolved. Alternatively, that request may be generated internally by primary resolver network monitor 20 or be sent from another network monitor 24a or 24b, shown functionally as block 31 in FIG. 2.

Figure 3:
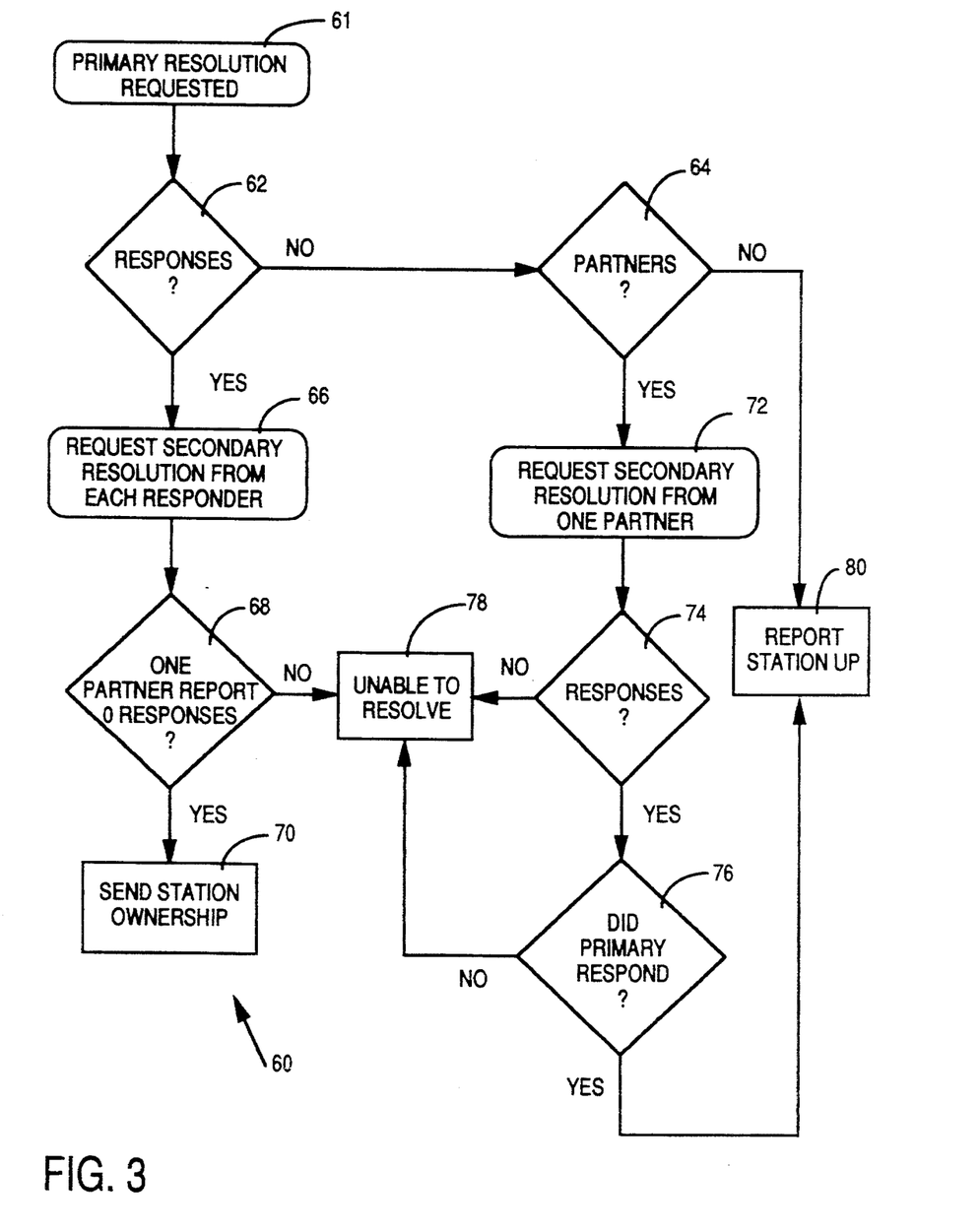
FIG. 3 illustrates a flow chart illustrating the process flow of the present invention.

With reference to FIG. 3, the first network monitor 20 will request primary resolution at step 61. The primary resolver network monitor 20 will call the "generating and sending a primary probe" function 34 to generate and send a probe message to the station to be resolved. Control block 122 in FIG. 4G may be used to perform the function 34. The control block 122 comprises a request code field 124 set equal to station segment probe and a probe type field 126 set to primary.

Once the primary resolver network monitor 20 sends the probes at step 61, the primary resolver network monitor 20 awaits for a predetermined time period, for example one minute, for responses from that probe message. Responses will be generated by the function identified as block 47 in FIG. 2 and may take the form of control block 128 in FIG. 4H. The control block 128 representing a primary observation report comprises a request code 130 indicating the probe was observed, a designation of the probe type 132 set to primary, and the node or address field 134 of the station whose ownership is being resolved. Only those network monitors 24a, 24b which actually read the primary probe on their segment 14a, 14b, respectively, will respond with a primary observation report. If the probe message represented by control block 122 does not appear on a local segment 14a, 14b, that is, the control block 122 was not transmitted by the attached bridge 16, the network monitors 24a, 24b do not see the control block 122 and thus cannot respond with a primary observation report.

Referring again to FIG. 3, at step 62, a decision block as to whether any observations of the primary probe were received is encountered by the primary resolver, in this case, network monitor 20. The network monitor 20 contains a function 36 shown in FIG. 2 for receiving primary observation reports. If primary observation reports represented by control block 128 were received by the primary resolver network monitor 20, processing continues at step 66. At step 66 the primary resolver network monitor 20 generates and sends secondary probe requests, illustrated functionally at block 38 in FIG. 2. The secondary probe requests may take the form of control block 110 shown in FIG. 4E, and described above, with a designation that the target station is a secondary resolver in field 114. Control block 110 is sent to each of the network monitors 24a, 24b which transmitted primary observation reports via control block 128 to the primary resolver network monitor 20, such network monitors being termed secondary resolvers.

Upon receipt of the secondary probe requests, the secondary resolvers send a secondary probe which may be represented as shown in FIG. 4G by control block 122 with field 126 set to secondary. The generation of a secondary probe is represented by the function indicated in block 48 of FIG. 2.

Similar to the primary resolver network monitor 20, each of the secondary resolvers will wait a predetermined time period, for example one minute, for receiving secondary observation reports. Such secondary observation reports may take the form of control block 128 as described above with the probe type field 132 set to secondary and will be sent to any network monitor, including the primary resolver network monitor 20, which reads the message on its local segment. Function block 40 in FIG. 2 illustrates the "observing secondary probes and generating secondary observation reports" function.

Each secondary resolver will create a summary of the secondary observation reports it receives and transmit that summary to the primary resolver network monitor 20. Such a summary of secondary probe results, represented functionally by block 49 in FIG. 2, may be transmitted to the primary resolver network monitor 20 in the form of control block 136 shown in FIG. 4I. Control block 136 comprises a request code field 138 and probe result 140 which together indicate that control block 136 contains the summary of secondary observation reports. Control block 136 also includes a field 142 indicating the number of observers of the secondary probe, and an address field 144 containing the station address which received the secondary probe.

Function block 42 in FIG. 2 illustrates the function of the primary resolver which receives the summaries in the form of control block 136 from the secondary resolvers. Function block 44 illustrates the resolving function as performed by the primary resolver network monitor 20. At step 68 in FIG. 3, there is a decision made by the primary resolver network monitor 20 as to whether one of the secondary resolvers received no secondary observation reports. If one and only one of the secondary resolvers reports no secondary observations in response to its secondary probe, then that secondary resolver is the owner of the station which was probed. At step 70, a station ownership indication is sent to that secondary resolver which may be in the form of control block 146 in FIG. 4J comprising the station owner field 148 and an address field 150 containing the station that was probed.

If it is determined at step 68 that none of the secondary resolvers reported no secondary observations or more than one secondary resolver reported no secondary observations, then the primary resolver network station 20 is unable to resolve station ownership as shown at step 78. The inability to resolve station ownership is then transmitted to the host network monitor (not shown) or to the initiator of the resolution request from the primary resolver network monitor 20 which message may, for example, be represented by control block 118 in FIG. 4F. Control block 118 contains a request code field 119 signifying that the primary resolver cannot resolve the station segment and an address field 120 indicating the address of the station whose ownership cannot be resolved.

Referring again to FIG. 3, if at decision block 62 the primary resolver network monitor 20 determines that the primary resolver network monitor 20 did not receive any primary probe observations in response to the primary probe, processing continues at decision block 64. At decision block 64, a determination is made as to whether the primary resolver network monitor 20 is part of a transparently bridged group. That information is known to the primary resolver network monitor 20 as it preferably maintains a list of its transparent partners as described above. If at decision block 64 the primary resolver network monitor 20 determines that it is not part of a transparently bridged group, i.e., it has no transparent partners, then the primary resolver network monitor 20 makes the determination that the station to be resolved is on its local segment 12. Thereafter, the primary resolver network monitor 20 reports that the station is up at step 80 to the initiator of the resolution request.

If at decision block 64 it is determined that the primary resolver network monitor 20 is part of a transparently bridged group, i.e., it has transparent partners, then processing continues at step 72. At step 72, the primary resolver selects one of its transparent partners and thereafter generates and sends a secondary probe request to the selected transparent partner, such secondary probe request represented by control block 110 in FIG. 4E as described above.

The selected transparent partner thus becomes the secondary resolver and proceeds to send a secondary probe to the station as outlined above. Each of the other network monitors, including the primary resolver network monitor 20, will perform the observing secondary probes and generating secondary observation reports function 40. The secondary resolver will compile the secondary observation reports and transmit those results to the primary resolver network monitor 20 using, for example, control block 136 in FIG. 4I as described above.

If control block 136 which is sent to the primary resolver network monitor 20 indicates that no secondary observation reports were received by the secondary resolver, processing proceeds from decision block 74 to step 78 as the primary resolver network monitor is unable to resolve station ownership. That result is transmitted to the host based network monitor (not shown) or the initiator of the resolution request using, for example, control block 118 in FIG. 4F as described above.

If control block 136 which is sent to the primary resolver network monitor 20 indicates that secondary observation reports were received by the secondary resolver, processing proceeds from decision block 74 to decision block 76. At decision block 76, the primary resolver network monitor 20 checks to see if the primary resolver network monitor 20 generated a secondary observation report. If the primary resolver network monitor 20 generated a secondary observation report, then the primary resolver network monitor 20 is the owner of the station whose ownership is being resolved. That determination is reported to the host based network monitor (not shown) or the initiator of the resolution request at step 80.

If at decision block 76 it is determined that the primary resolver network monitor 20 did not generate a secondary observation report, then the primary resolver network monitor 20 is unable to resolve station ownership as shown at step 78.

It will be understood that any network monitor, 20, 24a, 24b may serve as the primary resolver network monitor. Each of those network monitors 20, 24a, and 24b is preferably in communication with a host based network monitor (not shown) which initiates resolution requests and receives responses thereto. Such host based network monitor communications are ancillary to the present invention and are described herein for completeness.

FIGS. 4A through 4D illustrate control blocks 82, 92, 100, 102, respectively, which may be used for communications between the network monitor 20, 24a, 24b to the host based network monitor. In operation, the host based network monitor may request from the network monitors 20, 24a, 24b a list of currently unassigned stations (control block 100) and the network monitors 20, 24a, 24b may report such unassigned stations using control block 102. Control block 82 and control block 92 may be sent from the host based network monitor to the network monitors 20, 24a, 24b to update the station ownership tables in each network monitor 20, 24a, 24b.

Figure 5:
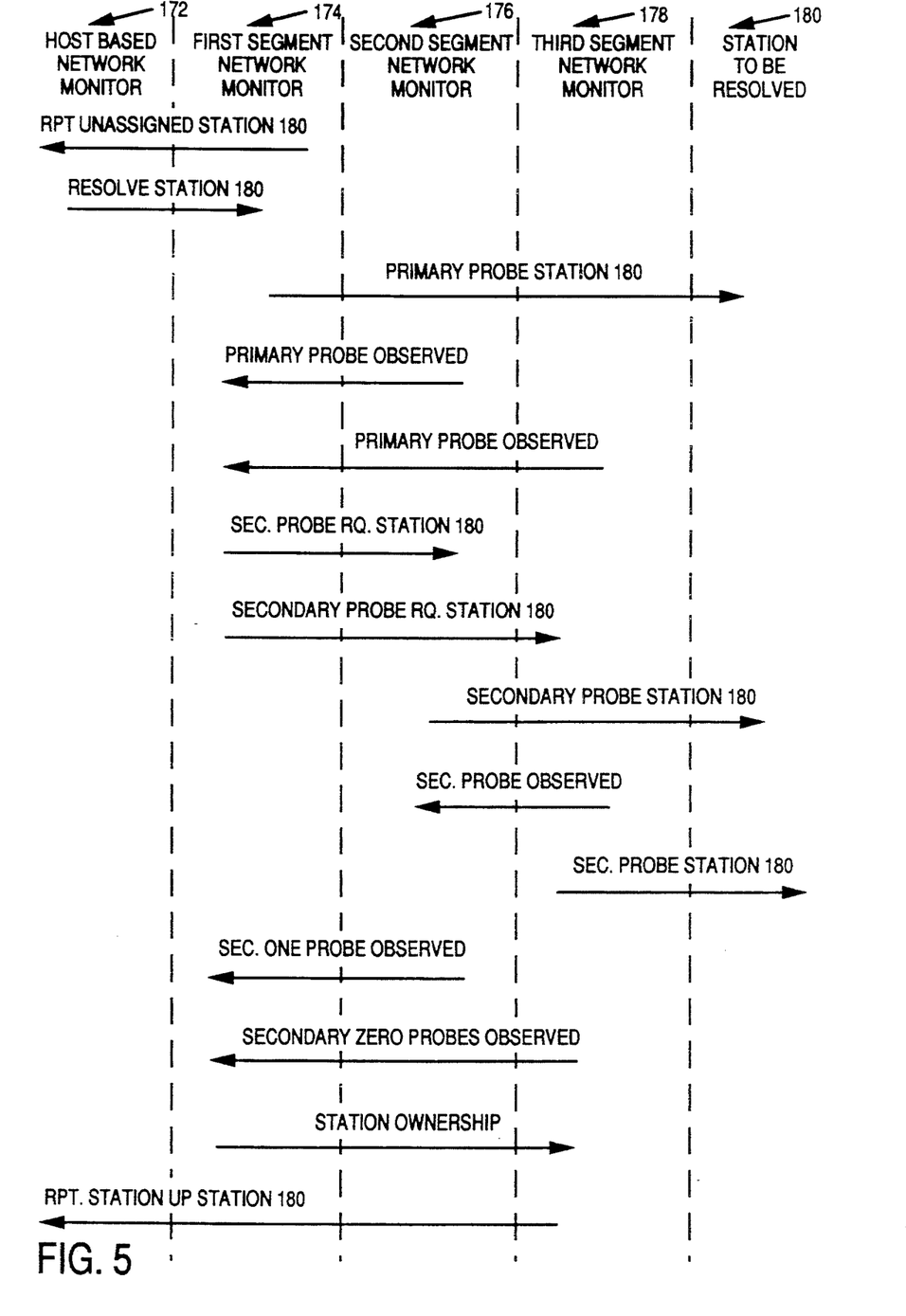
FIG. 5 illustrates a first time line example for the system and method of the present invention.
Figure 6:
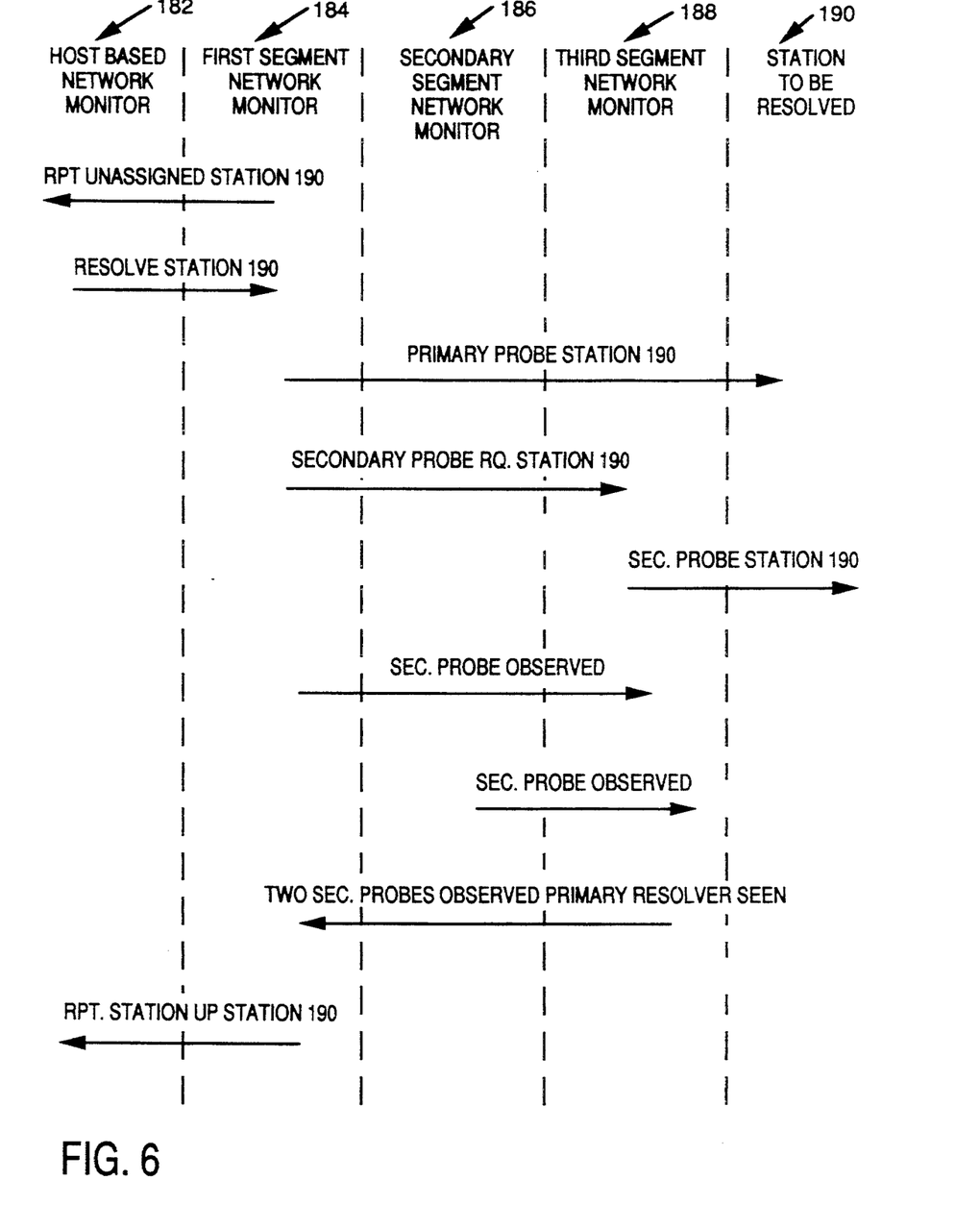
FIG. 6 illustrates a second time line example for the system and method of the present invention.

The method of operation of the present invention is illustrated by two examples, shown in FIGS. 5 and 6, for a network configuration similar to that shown in FIG. 1. FIG. 5 is an example of station segment resolution wherein the station whose ownership to be resolved does not reside on the primary resolver's local segment. FIG. 6 is an example of station segment resolution wherein the station whose ownership to be resolved resides on the primary resolver's local segment.

With reference to FIG. 5, there is shown message traffic between a host based network monitor program 172, a plurality of network monitor programs forming a system of transparently bridged monitors represented by numerals 174, 176, and 178, and a station 180 whose ownership is to be resolved. FIG. 5 message traffic is shown in chronological order with the earlier messages at the top and the later messages at the bottom. A first segment monitor 174 reports to the host based network monitor program 172 that station 180 is unassigned. In response thereto, the host based network monitor program 172 requests that the first segment network monitor 174 perform resolution for that station 180. The first segment network monitor sends a primary probe to station 180. The second and third segment network monitors 174, 176, respectively, report that the primary probe was observed. Thereafter, the first segment network monitor 174 sends a secondary probe request to the second and third segment network monitors 174, 176, respectively. The second segment network monitor 176 sends a secondary probe to station 180 and receives a secondary observation report from the third segment network monitor 178 in response thereto. The third segment network monitor 178 sends a secondary probe to station 180 and does not receive any secondary observation reports in response thereto. The second segment network monitor 176 reports to the first segment network monitor 174 that one secondary observation report was received. The third segment network monitor 178 reports to the first segment network monitor 174 that no secondary observation report was received. The first segment network monitor 174, after determining that station 180 is owned by the third segment network monitor 178, then sends a station ownership indication to the third segment network monitor 178, followed by a station up report from the third segment network monitor 178 to the host based network monitor program 172.

With reference to FIG. 6, there is shown message traffic between a host based network monitor program 182, a plurality of network monitor programs forming a system of transparently bridged monitors represented by numerals 184, 186, and 188, and a station 190 whose ownership is to be resolved. Similar to the above description, FIG. 6 message traffic is shown in chronological order with the earlier messages at the top and the later messages at the bottom. A first segment monitor 184 reports to the host based network monitor program 182 that station 190 is unassigned. In response thereto, the host based network monitor program 182 requests that the first segment network monitor 184 perform resolution for that station 190. The first segment network monitor sends a primary probe to station 190. Neither the second nor the third segment network monitors 186, 188, respectively, report that the primary probe was observed. Thereafter, the first segment network monitor 184 selects the third segment network monitor 188 and sends a secondary probe request thereto. The third segment network monitor 188 sends a secondary probe to station 190 and receives a secondary observation report from both the first and second network monitors 184, 186, respectively. Third segment network monitor 188 reports to the first segment network monitor 184 that two secondary observation reports were received, including one from the first segment network monitor 184. The first segment network monitor 184, after determining that station 190 resides on the first segment, then sends a station up report to the host based network monitor program 182.

While the present invention has been described in connection with an exemplary embodiment thereof, it will be understood that many modifications and variations will be readily apparent to those of ordinary skill in the art. This disclosure and the following claims are intended to cover all such modifications and variations.

What is claimed is:

1. A system for resolving a location of one of a plurality of stations on a network wherein said network comprises a plurality of segments, each segment connected to at least one other segment by a bridge operating transparently to the stations, said system comprising a plurality of network monitors, one being attached to each segment of said network, each of said network monitors comprising:

primary resolution means for generating and sending a primary probe via said network to a station to be resolved.:

primary observing means for monitoring primary probes and for generating and sending a primary observation report, said primary observing means being responsive to said primary probes;

first means for receiving said primary observation reports;

request means, responsive to said first means for receiving, for generating and sending secondary probe requests;

secondary resolution means for receiving secondary probe requests and for sending secondary probes via said network, said secondary resolution means being responsive to said secondary probe requests;

secondary observing means for monitoring said secondary probes and for generating a secondary observation report, said secondary observing means being responsive to said secondary probes;

second means for receiving said secondary observation reports;

means for creating and transmitting a summary of received secondary observation reports, said means for creating being responsive to said second means for receiving;

third means for receiving said summaries; and resolving means for resolving the location of said station based on said primary observation reports and said summaries.

2. The system of claim 1 wherein at least one primary observing means observes said primary probe and wherein said secondary probe requests are directed to each of said primary observing means which observe said primary probe; and whereby said resolving means resolves station ownership to be said primary observing means which observes said primary probe but does not observe each of said secondary probes.

3. The apparatus of claim 1 wherein no primary observing means observes said primary probe and wherein a secondary probe request is directed to one of said primary observing means and said secondary probe is observed by said primary resolution means; and whereby said resolving means resolves said primary resolution means to be owner of said station.

\* \* \* \* \*

UNITED STATES PATENT AND TRADEMARK OFFICE
CERTIFICATE OF CORRECTION

PATENT NO. : 5,437,046
DATED : July 25, 1995
INVENTOR(S) : Norman T. Bright, Keith S. Boyce, Robert Clark It is certified that error appears in the above-indentified patent and that said Letters Patent is hereby corrected as shown below:

```
Col. 10, line 15, delete "one" and substitute
   therefore -- each --.

Col. 10, line 16, delete "each segment of".
```

Signed and Sealed this

Twelfth Day of December, 1995

Attest:

BRUCE LEHMAN

Attesting Officer

Commissioner of Patents and Trademarks